United States Patent
Ma et al.

(10) Patent No.: US 7,116,067 B2
(45) Date of Patent: Oct. 3, 2006

(54) POWER CONVERTER CONTROLLING APPARATUS AND METHOD PROVIDING RIDE THROUGH CAPABILITY DURING POWER INTERRUPTION IN A MOTOR DRIVE SYSTEM

(75) Inventors: Jack Daming Ma, Mississauga (CA); George You Zhou, Mississauga (CA); Zheng Wang, Mississauga (CA)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 10/979,348

(22) Filed: Nov. 2, 2004

(65) Prior Publication Data

US 2006/0061320 A1    Mar. 23, 2006

Related U.S. Application Data

(60) Provisional application No. 60/611,298, filed on Sep. 21, 2004.

(51) Int. Cl.
*H02P 3/18* (2006.01)
*H02P 1/00* (2006.01)

(52) U.S. Cl. .............. 318/139; 318/138; 318/139; 318/151; 318/254; 318/434; 318/439; 318/700; 318/705; 318/721

(58) Field of Classification Search ............ 318/138, 318/139, 151, 376, 432, 453, 458, 479, 705, 318/721, 762, 801, 812; 702/183; 187/290
See application file for complete search history.

(56) References Cited

U.S. PATENT DOCUMENTS

| | | | |
|---|---|---|---|
| 3,593,103 A * | 7/1971 | Chandler et al. ........... | 363/174 |
| 3,781,614 A | 12/1973 | Mokrytzki et al. | |
| 3,828,233 A | 8/1974 | Brulard | |
| 3,848,169 A | 11/1974 | Asano et al. | |
| 3,851,233 A | 11/1974 | Sherman | |
| 4,353,023 A | 10/1982 | Kawada et al. | |
| 4,620,296 A * | 10/1986 | Siemon ...................... | 363/51 |
| 4,733,146 A | 3/1988 | Hamby | |

(Continued)

FOREIGN PATENT DOCUMENTS

JP    58-99286 A    6/1983

(Continued)

OTHER PUBLICATIONS

Patent Abstracts of Japan, vol. 006, No. 067, Apr. 28, 1982.

(Continued)

*Primary Examiner*—Lincoln Donovan
*Assistant Examiner*—Robert W. Horn
(74) *Attorney, Agent, or Firm*—Birch, Stewart, Kolasch & Birch, LLP (57) ABSTRACT

A method of controlling a power converter (20) of a motor drive system (10)controls the power converter (20) during a first operating mode by applying a current control scheme, which sets power converter commands to control torque current flowing from the power converter (20) to the motor (30) to achieve desired motor speed; and initiates a second operating mode when power supply to the power converter (20) is interrupted. The second operating mode includes controlling negative torque current between the power converter (20) and the motor (30) so that mechanical energy from the motor (30) charges an element (58) on a power supply side of the power converter (20). The first operating mode is resumed when the input power recovers. Torque current between the power converter (20) and the motor (30) is also controlled to limit a maximum transient DC bus voltage.

13 Claims, 6 Drawing Sheets

U.S. PATENT DOCUMENTS

| | | | |
|---|---|---|---|
| 4,736,146 A | 4/1988 | Bettendorf | |
| 4,787,021 A | 11/1988 | Hokari et al. | |
| 4,788,493 A | 11/1988 | Liptak | |
| 4,811,190 A | 3/1989 | Keir et al. | |
| 4,843,295 A | 6/1989 | Thompson et al. | |
| 4,876,637 A | 10/1989 | Mose et al. | |
| 4,902,954 A | 2/1990 | Oshima et al. | |
| 5,127,085 A * | 6/1992 | Becker et al. | 318/434 |
| 5,291,106 A | 3/1994 | Murty et al. | |
| 5,581,168 A | 12/1996 | Rozman et al. | |
| 5,917,297 A | 6/1999 | Gerster et al. | |
| 6,005,362 A * | 12/1999 | Enjeti et al. | 318/479 |
| 6,411,065 B1 * | 6/2002 | Underwood et al. | 322/20 |
| 6,422,351 B1 | 7/2002 | Tajima et al. | |
| 6,435,312 B1 | 8/2002 | Tajima et al. | |
| 6,522,099 B1 | 2/2003 | Tominaga et al. | |
| 6,577,087 B1 | 6/2003 | Su | |
| 6,611,126 B1 | 8/2003 | Mizuno | |
| 6,683,389 B1 * | 1/2004 | Geis | 290/40 C |
| 6,686,718 B1 | 2/2004 | Jadric et al. | |
| 6,768,284 B1 * | 7/2004 | Lee et al. | 318/808 |
| 6,777,898 B1 * | 8/2004 | Peterson | 318/139 |
| 6,847,515 B1 * | 1/2005 | Kelley et al. | 361/160 |
| 6,850,426 B1 * | 2/2005 | Kojori et al. | 363/123 |
| 2003/0098668 A1 | 5/2003 | Jadric et al. | |
| 2004/0041530 A1 | 3/2004 | Peterson | |
| 2006/0055349 A1 * | 3/2006 | Nakayama et al. | 318/254 |
| 2006/0061320 A1 * | 3/2006 | Ma et al. | 318/801 |

FOREIGN PATENT DOCUMENTS

| | | |
|---|---|---|
| JP | 60-121981 A | 6/1985 |
| JP | 61-135394 A | 6/1986 |
| JP | 62-126892 A | 6/1987 |
| JP | 63-249496 A | 10/1988 |
| JP | 3-27792 A | 2/1991 |
| JP | 3-112396 A | 5/1991 |
| JP | 4-58786 A | 2/1992 |
| JP | 4-71392 A | 3/1992 |
| JP | 4-355594 A | 12/1992 |
| JP | 5-56682 A | 3/1993 |
| JP | 5-137244 A | 6/1993 |
| JP | 5-268794 A | 10/1993 |
| JP | 6-70593 A | 3/1994 |
| JP | 6-189572 A | 7/1994 |

OTHER PUBLICATIONS

Patent Abstracts of Japan, vol. 006, No. 247, Dec. 7, 1982.

* cited by examiner

POWER CONVERTER CONTROLLING APPARATUS AND METHOD PROVIDING RIDE THROUGH CAPABILITY DURING POWER INTERRUPTION IN A MOTOR DRIVE SYSTEM

RELATED APPLICATION

This application claims priority under 35 U.S.C. § 119(e) of Provisional Application No. 60/611,298 filed Sep. 21, 2004, the entire contents of which are herein incorporated by reference.

FIELD OF THE INVENTION

The present invention relates to electrical power conversion, and more particularly to a power converter controlling apparatus and method proving ride through capability during power interruption in a motor drive system.

BACKGROUND OF THE INVENTION

An exemplary motor drive system includes the following main components: a motor, such as a three-phase permanent magnet synchronous motor (PMSM); a multi-phase power inverter; a DC power supply; and a current controller, which generates gating signals for output to the power inverter. The power inverter converts DC power from power supply into multi-phase AC power, e.g., utilizing a configuration of insulated-gate bipolar transistors (IGBTs), as a function of rotor position/speed. Rotor position/speed can be monitored using sensors or derived using sensorless techniques. The current controller controls the power inverter, e.g., using pulse width modulation (PWM) control, so that the power converter outputs the desired multi-phase AC power to the motor. Thus, during operation of the motor, the power converter converts DC power from the DC power supply into multi-phase AC power and supplies such multi-phase AC power to the motor, to create motor torque.

Variable speed motor drive systems are increasingly used in aerospace applications. In those applications, the size of DC energy storage components is typically minimized to achieve high power density, and reliable operation during DC power interruptions is a key requirement. Most current implementations respond to power interruptions by disabling inverter gating and opening all contactors between the inverter and the motor to leave the motor in a free deceleration mode. In a speed sensorless system, system operation is typically necessary to derive motor position/speed information. Because such systems will lose rotor position information once gating is disabled and the contactors are opened, it is difficult to achieve resynchronization after a power interruption. After power is resumed, the system must go through soft start and resynchronization when speed sensorless techniques are used, before resuming normal operation. Even with a speed sensor, soft start is still required. Such soft start and resynchronization procedures cause delays and non-smoothness, which is particularly undesirable for aerospace applications.

SUMMARY OF THE INVENTION

In one respect, the present invention is a method of controlling a power converter of a motor drive system, the method comprising: controlling the power converter during a first operating mode by applying a current control scheme, which sets power converter commands to control torque current flowing from the power converter to the motor to achieve desired motor speed; and initiating a second operating mode when power supply to the power converter is interrupted, wherein the second operating mode includes controlling a negative torque current between the power converter and the motor so that mechanical energy from the motor charges an element on a power supply side of the power converter. The method further comprises controlling the torque current to limit a maximum transient DC bus voltage.

In another respect, the present invention is a power converter controlling apparatus for controlling a power converter of a motor drive system, the controlling apparatus comprising: a current controller, which outputs gating signals to the power converter as a function of a torque current reference and a flux current reference; a torque current reference generator, which generates the torque current reference used by the current controller; and a flux current reference generator, which generates flux current reference used by the current controller, wherein the current controller controls the power converter during a first operating mode to create torque current flowing from the power converter to the motor to achieve desired motor speed; and controls the power converter in a second operating mode, initiated when power to the power converter is interrupted, so that a negative torque current between the power converter and the motor draws mechanical energy from the motor to charge an element on a power supply side of the power converter. The torque current reference generator includes a DC bus voltage regulator to limit maximum transient DC bus voltage.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

In one general aspect of the present invention, a voltage source inverter (VSI) based motor drive system selectively initiates generator mode control, during power interruption, to transition the motor from a motor mode to a generator mode. In one embodiment, during generator mode, the mechanical energy on the motor shaft is used to boost up and maintain a DC link capacitor voltage at a certain level, which is slightly higher than the normal operation DC link voltage. This is done to limit the inrush current when the input power recovers. Only a small amount of energy is required to compensate for the inverter power losses. The motor will decelerate slowly until power supply is recovered. During this period, because the motor is still under control, speed information is still available and DC capacitor voltage is still high enough. After supply power recovery, the motor can be switched back to motor mode. This is achieved without the need for a soft start and re-synchronization process. This is particularly significant for typical speed sensorless motor drive systems, because the speed information will typically not be available if current control loop is disabled. During power interruption, if motor speed is lower than a certain speed limit, the system will shut down because there is not enough energy to support DC capacitor voltage at a certain level. Under this condition, the motor will need to be restarted after power recovery.

Figure 1:
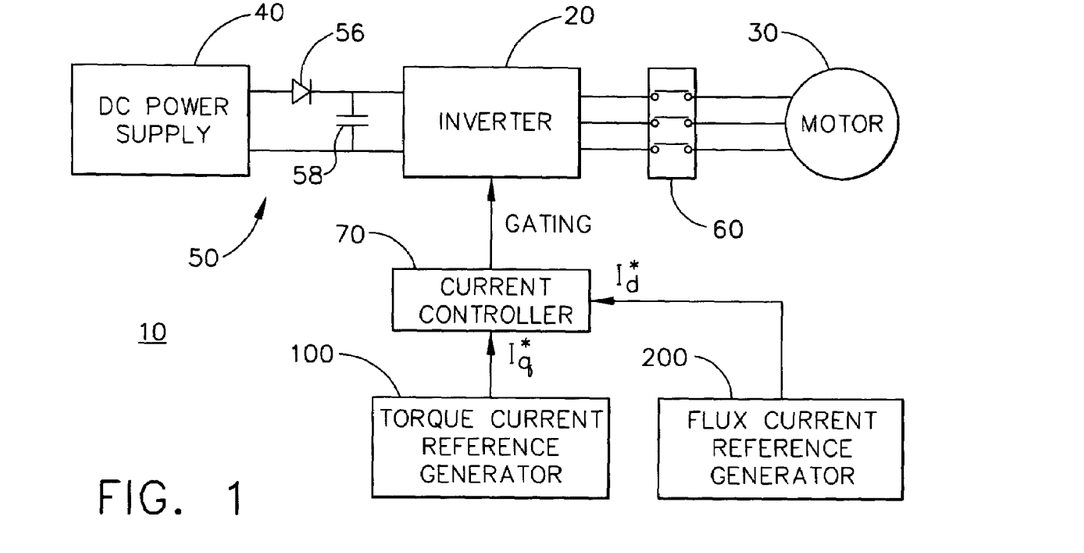
FIG. 1 is a block diagram of an exemplary motor drive system to which principles of the present invention may be applied to provide ride through capability during a power supply interruption in accordance with an embodiment of the present invention.

FIG. 1 is a block diagram of an exemplary motor drive system 10 to which principles of the present invention may be applied to provide ride through capability during a power supply interruption in accordance with an embodiment of the present invention. As shown in FIG. 1, the motor drive system includes: a power inverter 20, a motor 30; a DC power supply 40; a DC bus 50; a blocking diode 56; a DC link capacitor 58; electrical contactors 60 providing electrical connection between the inverter 20 and the motor 30; a current controller 70; a torque current reference generator 100; and a flux current reference generator 200.

The DC power supply 40 can be a DC generator, a diode rectifier, an active rectifier, etc., and may include soft start circuitry. The blocking diode 56 prevents power from feeding back to the DC power supply 40 or other systems supplied by the same DC power source. The DC link capacitor 58 is connected at the input side of the inverter 20. The inverter 20 can be any type of voltage source inverter. The motor 30 can be any type of motor, such as a brushless synchronous motor. The current controller 70 can be any type of current controller that generates gating according to current reference. As is known in the art, a typical current controller controls torque current and flux current components flowing from the inverter to the motor based on direct axis (d-axis) and quadrature axis (q-axis) reference values (i.e., Id-ref for flux current control and Iq-ref for torque current control). Iq-ref is used to control motor torque, and also is referred to herein as Iq*. The flux current reference generator 200 can be any type of flux current generator. Id_ref is used to control motor flux, and also is referred to herein as Id*.

Figure 2:
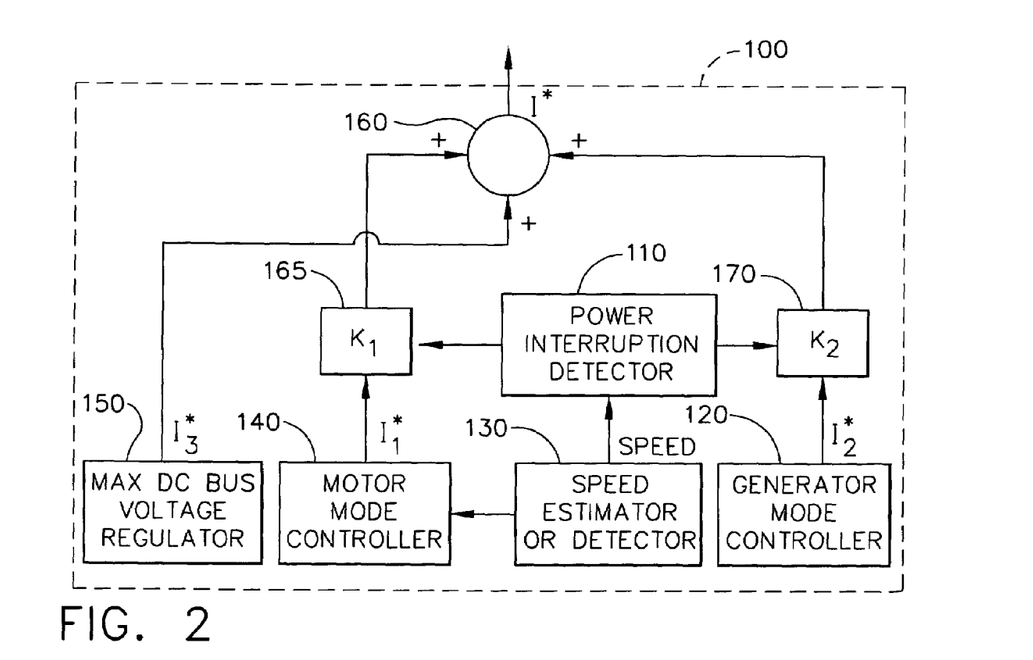
FIG. 2 is a functional block diagram illustrating functional components of a motor torque current reference generator in accordance with an embodiment of the present invention.

FIG. 2 is a functional block diagram illustrating functional 30 components of the torque current reference generator 100 in accordance with an embodiment of the present invention. As shown in FIG. 2, the torque current reference generator 100 includes: a power interruption detector 110; a generator mode controller 120; a speed estimator or detector 130; a motor mode controller 140; and a max DC bus voltage regulator 150. The torque current reference generator 100 further includes weighting elements 165, 170 and combiner 160. These illustrated functional elements combine to generate a torque current control reference (Iq*), which is output to the current controller 70 to control torque current between the inverter 20 and the motor 30 depending on the state of operation. The operation of these elements will be described in greater detail below. It should be recognized that the illustration of elements in FIG. 2 is for ease of explanation, and that various physical configurations, e.g., using various combinations of hardware, software, logic circuitry, ASICs, etc., can be implemented to achieve these functions. The speed estimator or detector 130 can be a sensor or sensorless.

Figure 3:
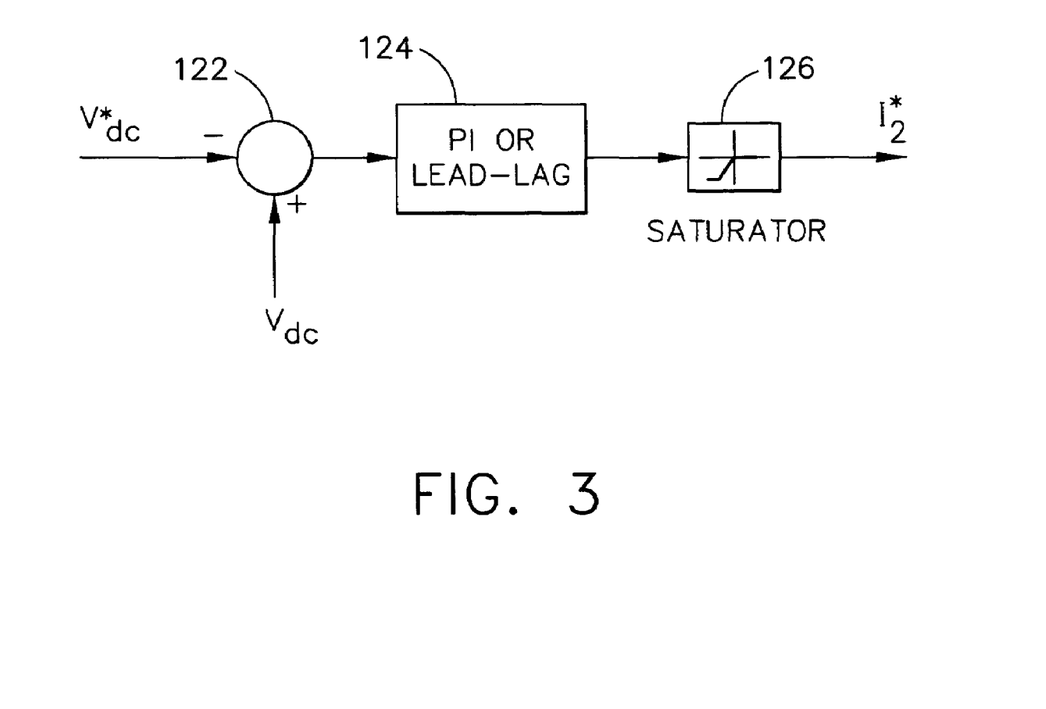
FIG. 3 illustrates a generator mode controller for regulating torque current during a power interruption in accordance with an embodiment of the present invention.

FIG. 3 illustrates a generator mode controller 120 in accordance with an embodiment of the present invention. As shown in FIG. 3, the generator mode controller 120 includes: a comparator 122; a proportional integrator (PI) or Led-Lag compensator 124; and a saturator 126. In FIG. 3, $V_{dc}*$ is a reference voltage for the DC link capacitor 58, which is slightly higher than the normal operation DC link voltage. The difference between the DC link voltage ($V_{dc}$) and $V_{dc}*$ is determined by comparator 122, which outputs an error signal that is fed into the PI or Lead-Lag compensator 124, which creates the current reference $I_2*$. The saturator 126 is used to limit the $I_2*$ at range of negative torque current. In this way, under normal condition, when the DC link voltage is lower than $V_{dc}*$, the output of the generator mode controller 120 will be negative. However, this negative value will not exert any impact on the control because the weighting element 170 is set to zero by the power interrupt detector 110.

Figure 4:
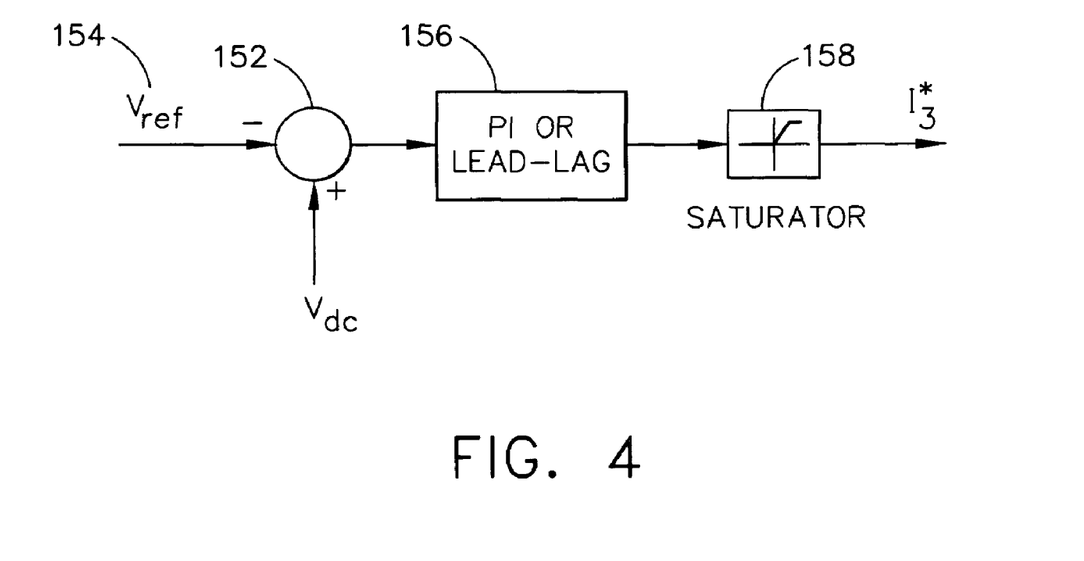
FIG. 4 illustrates a max DC link voltage regulator, which operates in conjunction with both the motor mode controller and the generator mode controller to limit the maximum transient DC bus voltage when transitioning between motor mode and generator mode control in accordance with an embodiment of the present invention.

FIG. 4 illustrates an embodiment of the max DC bus voltage regulator 1 50, which limits the maximum transient DC bus voltage when transitioning between motor mode and generator mode. The max DC bus voltage regulator 150 includes: a $V_{ref}$ storage unit 154; a comparator 152 which compares $V_{ref}$ with the $V_{dc}$; and a DC link voltage control element 156 (e.g., a PI or Lead lag Controller), which generates a current reference $I_3*$. A saturator 158 is used to limit the $I_3*$ in the range of positive torque current. In this way, under normal condition when DC link voltage is lower than $V_{ref}$, the output of the regulator 150 will be zero. As explained in greater detail below, $I_3*$ limits the maximum DC bus voltage during motor mode and generator mode transitions.

Figure 5:
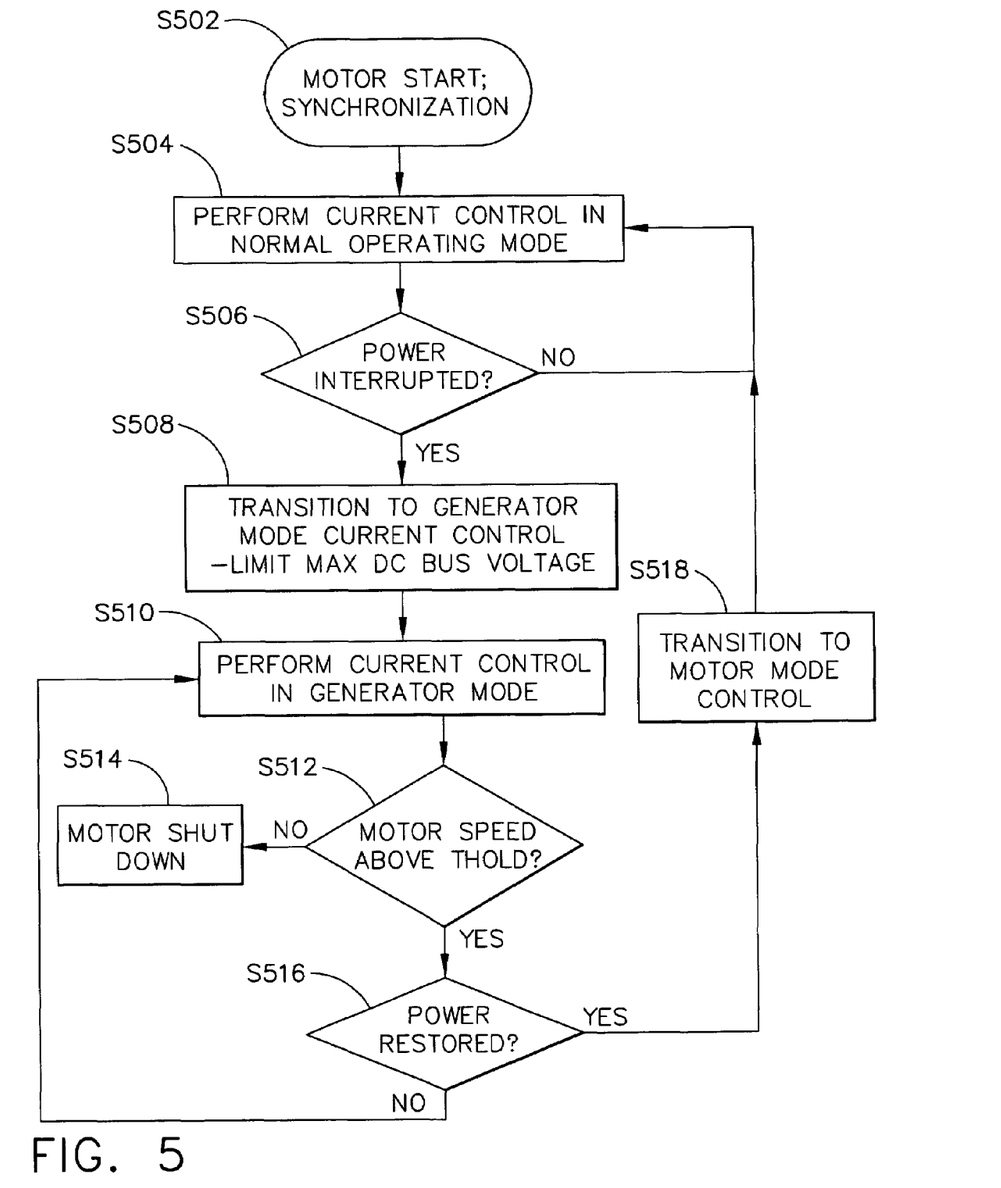
FIG. 5 is a flow diagram illustrating a torque current control technique for providing ride through capability during power supply interruption in accordance with an embodiment of the present invention.

Operation of the torque current reference generator 100 will next be described, with reference to the flow diagram of FIG. 5. After the motor has started (e.g., using a soft start) and achieved synchronization (S502), the torque current reference $I_1*$ generated by the motor mode controller 140 will be output as $I_q*$ so that current control is performed normally (S504). When the power interruption detector 110 detects a power interruption (S506), the output of generator mode controller 120 will be activated for $I_2*$, which will cause a transition to generator mode current control (S508).

When the power interruption detector 110 detects power interruption, $K_1$ in weighting element 165 will be set to 0 and $K_2$ in weighting element 170 will be set to 1. The current reference I* will come from generator mode controller 120 and max DC bus voltage regulator 150, e.g., $Iq*=I_2*+I_3$. Negative torque current will be created to support DC capacitor voltage at $V_{dc}*$. The drive system 10 operates at generator mode (S510). When power supply is resumed (S516), $K_1$ in weighting element 165 will be set to 1 and $K_2$ in weighting element 170 will be set to 0. The current reference $I_q*$ will come from motor mode controller 140 and max DC bus voltage regulator 150 (e.g., $Iq*=I_1*+I_3*$). Positive torque current will be created to spin the rotor. The drive system operates at motor mode. During power interruption, if it is determined that motor speed is lower than a certain limit (S512), both $K_1$ and $K_2$ will be set to 0 and the system will be shut down (S514).

The max DC bus voltage regulator 150 is added to limit the maximum DC bus voltage during the transition between two different operating modes. The DC link capacitor 58 with higher capacitance value will have better susceptibility in tolerating these transitions. But the high power density requirement for aerospace applications usually does not allow this luxury. The DC link voltage regulator 150 determines when the DC link voltage is detected higher than a predefined threshold, $V_{ref}$ in element 154 (which is mainly application dependent with one condition, that is the Vref should be higher than Vdc* defined in the generator mode controller 120), and a positive torque current reference $I_3$* will be commanded to release the extra energy in the DC link capacitor to the load.

Figure 6A:
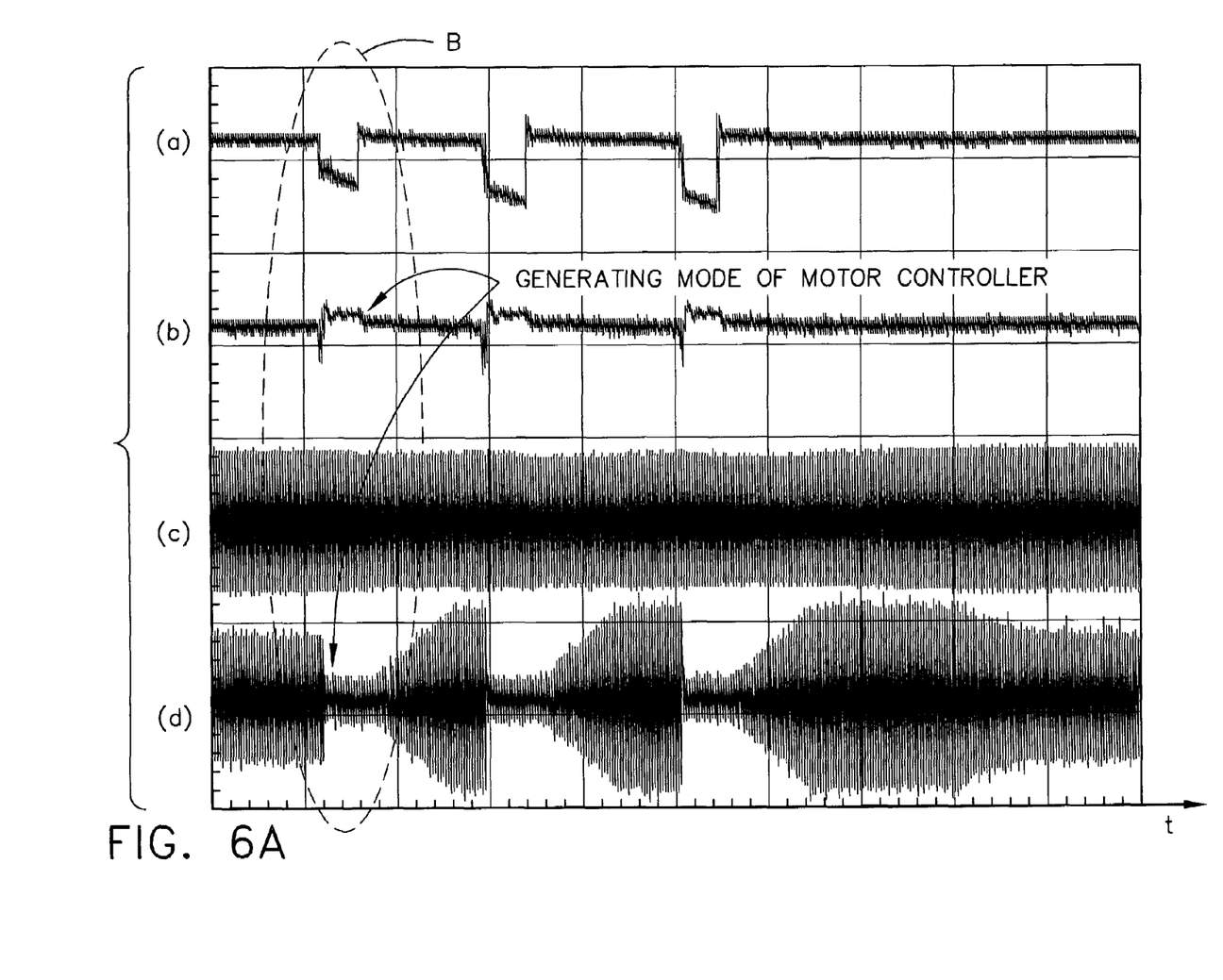
FIGS. 6A–6C are signal waveforms illustrating test results of toque current control during power supply interruption consistent with principles of the present invention.
Figure 6B:
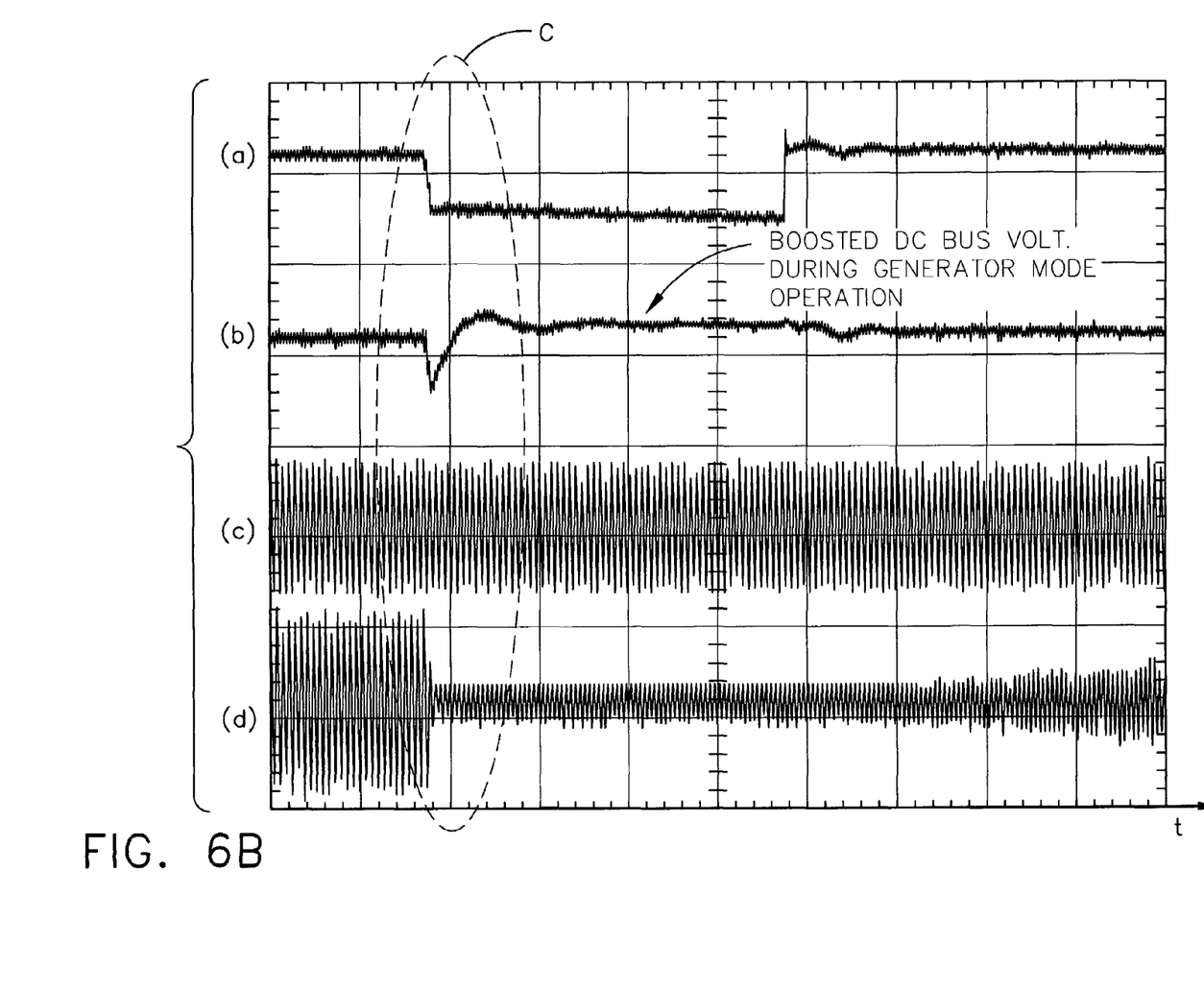
Figure 6C:
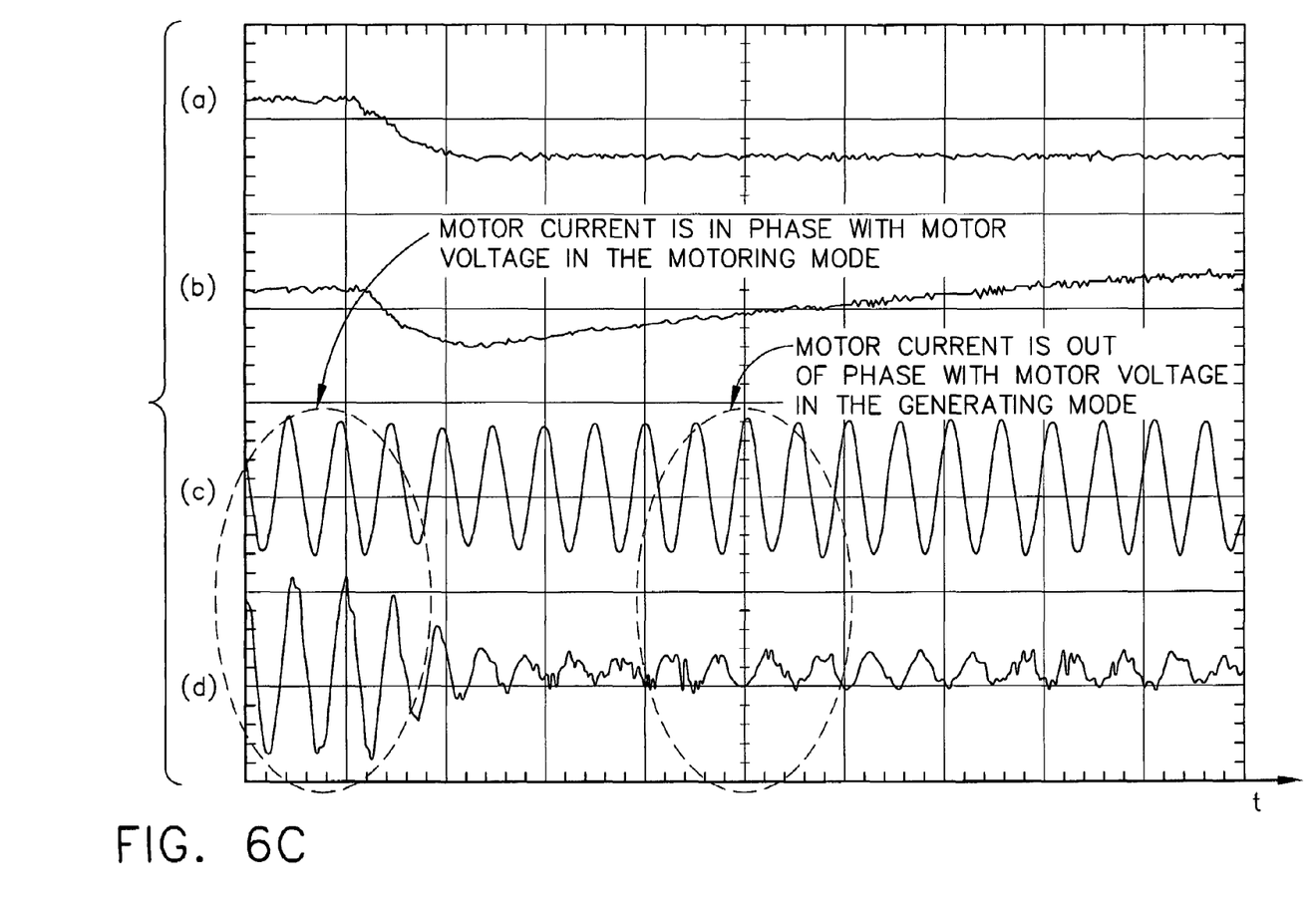

FIGS. 6A–6C are signal waveforms illustrating test results of torque current control, demonstrating ride through capability during power interruptions.

In FIG. 6A, waveform (a) is the DC bus voltage at the power supply side of the blocking diode 56; waveform (b) is the DC bus voltage across the DC link capacitor 58; waveform (c) is the terminal voltage of motor 30; and waveform (d) is the output current of inverter 20. As shown in waveform (b), the DC bus voltage across the DC link capacitor 58 is boosted and maintained at a certain level, which is slightly higher than the normal operation DC link voltage, during power interruption.

FIG. 6B illustrates portions of waveforms (a)–(d) during a power interruption in greater detail ("zoomed-in"). FIG. 6C illustrates portions of waveforms (a)–(d) during power interruption in still greater detail. In FIG. 6C, it can be seen that the motor current (waveform (d)) is in phase with motor voltage (waveform (c)) during motoring mode and out of phase with motor voltage during generator mode.

What is claimed is:

1. A power converter controlling apparatus for controlling a power converter of a motor drive system, said controlling apparatus comprising:
a current controller, which outputs gating signals to said power converter as a function of a torque current reference and a flux current reference; and
a torque current reference generator, which generates the torque current reference used by said current controller, wherein
said current controller controls said power converter during a first operating mode to create torque current flowing from said power converter to the motor to achieve desired motor speed;
controls the power converter in a second operating mode, initiated when power to said power converter is interrupted, so that negative torque current between said power converter and said motor draws mechanical energy from said motor and charges an element on a power supply side of said power converter; and
controls the torque current between said power converter and said motor to limit maximum transient bus voltage;
wherein said torque current reference generator:
monitors DC bus voltage between said power converter and the power supply;
compares the monitored DC bus voltage to a reference value; and
controls a torque current reference based on the result of said comparing step to limit a maximum DC bus voltage during transition between the first and second operating modes.

2. The apparatus according to claim 1, wherein said element on the power supply side of said power converter is a DC link capacitor.

3. The apparatus according to claim 1, wherein, during said second operating mode, said motor functions as a generator and said power converter functions as an active rectifier to charge said element.

4. The apparatus according to claim 1, wherein said motor decelerates during second operating mode, and said torque current reference generator:
switches to said first operating mode after power input to said power converter is recovered.

5. The apparatus according to claim 4, wherein said torque current reference generator switches to said first operating mode after power input to said power converter is recovered without requiring a soft start sequence.

6. The apparatus according to claim 1, wherein
said first operating mode is applied based on motor speed/position information, and
said torque current reference generator monitors speed/position information during said second operating mode, such that a re-synchronization process is not needed upon switching to said first operating mode.

7. The apparatus according to claim 1, wherein said power converter is an inverter.

8. The apparatus according to claim 1, wherein said power converter is connected to a DC power supply via a DC link, wherein DC link voltage in said second operating mode is higher than DC link voltage in said first operating mode.

9. The apparatus according to claim 1, wherein
said current control scheme in said first operating mode is applied based on motor speed/position information, and
said motor drive system is a speed sensorless system.

10. The apparatus according to claim 1, wherein
said current control scheme in said first operating mode is applied based on motor speed/position information, and
said motor drive system includes a motor speed sensor.

11. The apparatus according to claim 1, wherein
said second operating mode provides ride through capability during power interruption.

12. The apparatus according to claim 1, wherein said motor drive system is an aerospace motor drive system.

13. The apparatus according to claim 1, wherein transition between said first and second operating modes is a hard switch.

* * * * *